United States Patent [19]

Seike et al.

[11] Patent Number: 4,984,860
[45] Date of Patent: Jan. 15, 1991

[54] OPTICAL FIBER-CONTAINING INSULATORS AND PRODUCING PROCESS THEREOF

[75] Inventors: Shoji Seike; Toshiyuki Mima, both of Nagoya; Koichi Mori, Handa, all of Japan

[73] Assignee: NGK Insulators, Ltd., Japan

[21] Appl. No.: 446,680

[22] Filed: Dec. 6, 1989

[30] Foreign Application Priority Data

Dec. 6, 1988 [JP] Japan .................. 63-306960

[51] Int. Cl.[5] .................. G02B 6/00; G02B 6/14; G02B 6/26; H01B 17/00
[52] U.S. Cl. .................. 350/96.10; 174/139
[58] Field of Search .............. 350/96.10, 96.20, 96.21, 350/96.23; 174/139; 29/631

[56] References Cited

U.S. PATENT DOCUMENTS 4,810,836  3/1989  Shinoda et al. .................. 174/139

FOREIGN PATENT DOCUMENTS 1-90007  6/1989  Japan .

Primary Examiner—Akm Ullah
Attorney, Agent, or Firm—Parkhurst, Wendel & Rossi

[57] ABSTRACT

An optical fiber-containing insulator including an insulator body having a through hole and an optical fiber inserted into the through hole in which an insulation gas or an organic material is filled in a middle portion of the through hole, the insulator comprising wide-mouthed portions arranged in both end portions of the through hole, cylindrical members inserted into the wide-mouthed portions and heat-resistive adhesive agent member arranged between the insulation gas or organic insulation material and the cylindrical member. A process for producing such an optical fiber-containing insulator is also disclosed.

2 Claims, 4 Drawing Sheets

FIG_2a
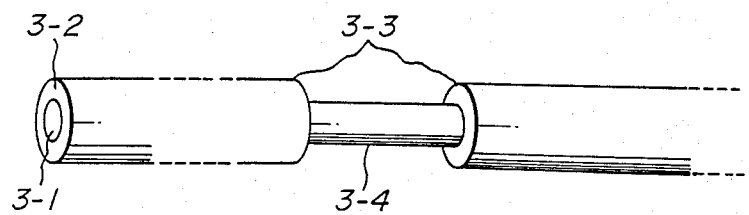
FIG_2b
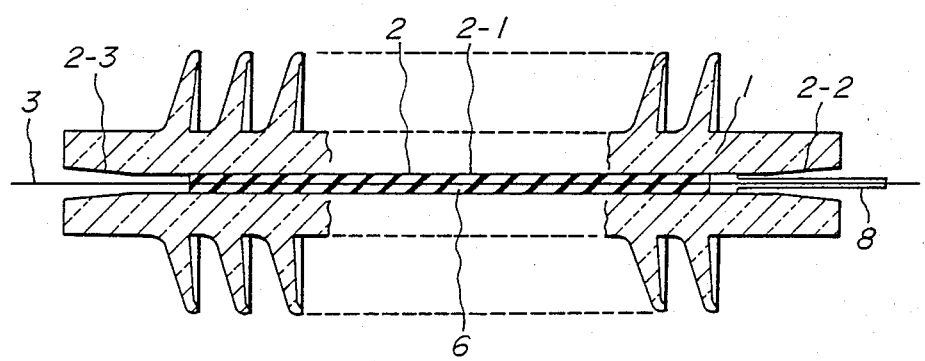

FIG_2c
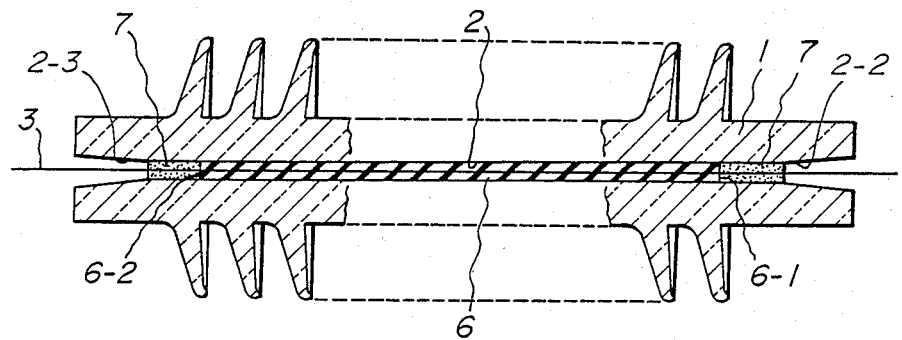
FIG_2d
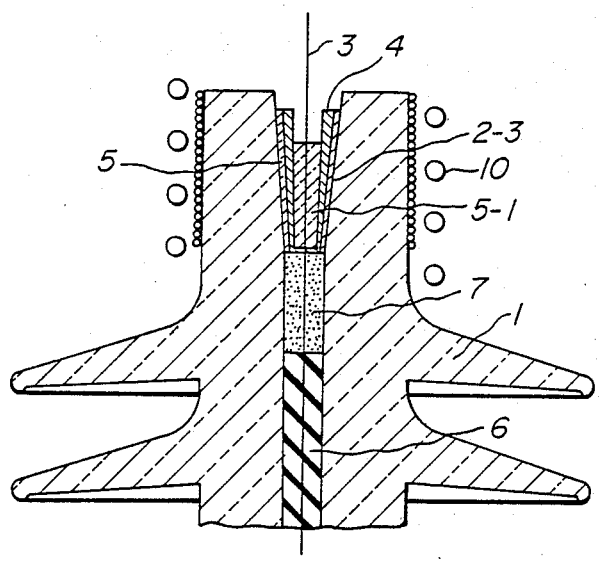

FIG_2e
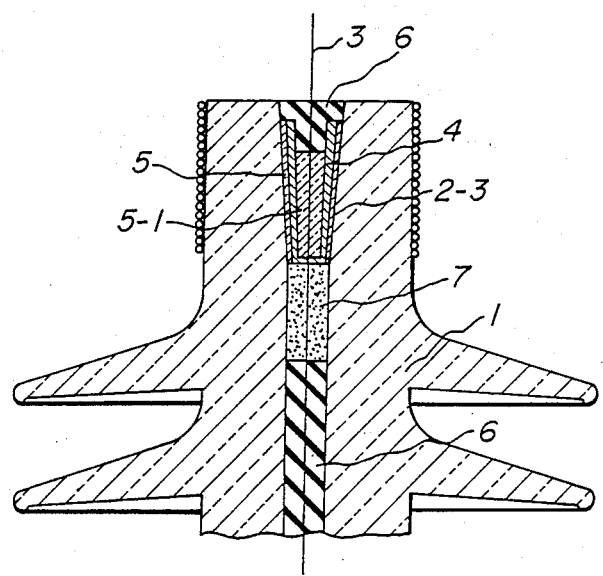

OPTICAL FIBER-CONTAINING INSULATORS AND PRODUCING PROCESS THEREOF

BACKGROUND OF THE INVENTION

Field of the Invention and Related Arts Statement

The present invention relates to optical fiber-containing insulators which can endure environmental stresses, for example, due to temperature variations of the environments to be used and which can maintain air-tight properties for a long time. The present invention also relates to a process thereof.

In power substations, power-transmission lines and power-distribution lines, it is desired to provide a system for quickly detecting faults in electric power systems and for immediately repairing these faults. Usually, there has been known an apparatus for detecting unusual currents or unusual voltages which utilizes an optical sensor having characteristics such as Faraday effects and Pockels effects. Moreover, in order to insulate the transmission current or the transmission voltage between a fault locator and the optical sensor arranged to a conductor of the normally power supplying side, use is made of an insulator. Therefore, it is necessary to use the optical fiber-containing insulator which transmits only optical signals while maintaining the electric insulating properties. In the optical fiber-containing insulator used for this purpose, it is necessary to maintain a mechanical strength and an electric insulation property for a long time in addition to the transmission properties of the optical signals.

In the optical fiber-containing insulators, as to sealing materials for maintaining air-tight properties between the optical fiber and a porcelain, use is made of an organic material or an inorganic material such as glass, and both of them have special merits and demerits, respectively.

When use is made of an organic material such as silicone rubber as the sealing material, it is possible to seal airtightly a space between the optical fiber and the porcelain and to perform a sealing operation easily in low temperatures, and thus there is a merit such that a manufacturing of the optical fiber-containing insulator can be performed easily in a large scale.

Contrary to this, when use is made of an inorganic material such as glass as the sealing material, the inorganic material has excellent weatherproof and chemical corrosionproof properties in comparison with the organic material and thus if material characteristics such as thermal expansion coefficients of the inorganic material meet with those of the surrounding material, it is possible to achieve an excellent long reliability on the air-tight and insulation properties.

In the optical fiber-containing insulator in which the organic material is used as the sealing material, since thermal expansion coefficients between the organic material and the porcelain are largely different from each other in a general case, there is a drawback such that there occurs a deterioration of the organic material used as the sealing material due to a temperature variation generated in the environmental temperatures and a breakage of the optical fiber due to the deterioration of the organic material. Moreover, since the organic material is deteriorated due to a tracking generated therein for a long term, it is preferred that, as to the sealing material for maintaining the air-tight and insulation properties, use is made of the inorganic material such as glass having the substantially same thermal expansion coefficient as that of the porcelain.

Contrary to this, in the optical fiber-containing insulator using the glass mentioned above, since a large furnace must be used so as to melt the glass by heating the whole porcelain, there is a drawback such that an equipment cost increases and a cost of power consumption also increases.

Further, as to the optical fiber used in the optical fiber-containing insulator, it is necessary to use the optical fiber made of quartz glass in view of the heat resistive properties. The mechanical strength of the optical fiber is maintained by covering an organic material as a covering layer such as silicone resin, urethane resin and epoxy resin on an outer surface of threads just after spinning threads out of another material made of quartz glass. Since the mechanical strength of the optical fiber is extremely low if there is no covering layer, the covering layer must be arranged on the outer surface of the optical fiber to handle it.

However, such an organic covering layer does not basically endure a heat treatment performed above 300° C. Therefore, if the organic covering layer is once deteriorated by the heat treatment etc., the optical fiber becomes very brittle and thus it is broken under extremely low strength than that before the heat treatment. For example, when a diameter of the optical fiber is 125 $\mu$m, the breaking load of the optical fiber is 6 kg before the heat treatment and is 0.5 kg after the heat treatment.

Accordingly, when the whole insulator is heated so as to melt the glass materials for the sealing, the strength of a part of the optical insulator projected from the porcelain becomes low and then the optical fiber is broken in the next step. Therefore, after sealing the optical fibers in the porcelain, the opposed end surfaces of the insulator containing the optical fibers are mirror-polished and then it is necessary to connect optically the other optical fibers to the bared optical fibers in the insulator by using ferrules. In this case, there occurs a drawback such that the manufacturing steps become complicated and thus the manufacturing cost increases.

SUMMARY OF THE INVENTION

It is an object of the present invention to eliminate the drawbacks mentioned above and to provide optical fiber-containing insulators and a producing process thereof, in which reliable optical fiber-containing insulators can be produced in an easy manner.

According to the invention, an optical fiber-containing insulator including an insulator body having a through hole provided in a center axis portion thereof and an optical fiber inserted into said through hole, in which an insulation gas or an organic insulation material is filled in a middle portion of said through hole, comprises wide-mouthed portions arranged in both end portions of said through hole, cylindrical members inserted into said wide-mouthed portions and having an outer surface corresponding to an inner surface of said wide-mouthed portions, the optical fiber in said cylindrical member and a space between the outer surface of said cylindrical member and the inner surface of said wide-mouthed portion being sealed by an inorganic material, and heat-resistive adhesive agent members arranged between said insulation gas or organic insulation material and said cylindrical member.

Moreover, according to the invention, a process for producing an optical fiber-containing insulator including an insulator body having a through hole provided in a center axis portion thereof and an optical fiber inserted into said through hole, in which an insulation gas or an organic insulation material is filled in a middle portion of said through hole, comprises the steps of (a) inserting the optical fiber into said through hole, both end portions of which have wide-mouthed portions, (b) filling said insulation gas or organic insulation material into a center portion of said through hole, (c) arranging heat-resistive adhesive agents between a sealing portion consisting of said insulation gas or organic insulation material and said wide-mouthed portions, (d) inserting conductive cylindrical members having an outer surface corresponding to an inner surface of said wide-mouthed portions into said wide-mouthed portions through an inorganic glass, (e) inserting inorganic glass member into said conductive cylindrical member through the optical fiber, and (f) melting said inorganic glass arranged between the inner surface of said wide-mouthed portions and the outer surface of said cylindrical members and said inorganic glass member arranged in said cylindrical member, through which the optical fiber is arranged, by heating said conductive cylindrical member by means of a high-frequency induction heating method so as to form end sealing constructions.

In the construction mentioned above, since use is made of a glass material having a thermal expansion coefficient close to that of the porcelain as a sealing material, during a use as the optical fiber-containing insulator, sealed portions become resistive with respect to a heat stress generated due to a variation of environmental temperatures and show good airtight properties for a long time. Further, since use is made of an inorganic material, it is possible to obtain the sealing portion having good weatherproof properties.

Moreover, since an insulation gas such as $SF_6$ etc. or an organic insulation material such as silicone oil, mineral oil, silicone grease, urethane rubber, silicone rubber etc. is filled in an inner through hole portion of the insulator except for both end portions which are sealed by the glass material, a withstanding voltage of the inner through hole portion of the insulator can be made larger than that of a surface of the insulator, and thus it is possible to eliminate a flashover in the inner through hole portion of the insulator.

Further, since an insulation material such as silicone oil, mineral oil, silicone grease, urethane rubber, silicone rubber etc. which can seal or adhere airtightly a space between the optical fibers and the porcelain, predetermined airtight properties can be maintained even if the airtight sealing is broken by mechanical damage of the sealing portion etc. and thus the optical fiber-containing fiber having higher airtight reliability can be obtained.

Furthermore, since the organic insulation material is filled in the inner through hole portion, no void portions exist in the inner through hole portion, or since the insulation gas such as $SF_6$ etc. is arranged in the inner hole portion, a withstanding voltage of the inner through hole portion of the insulator can be increased. Therefore, no corona is generated in the inner through hole portion and thus it is possible to eliminate a little tracking of the covering layer of the optical fiber generated in an always voltage applied state.

Moreover, the optical fiber-containing insulator has the construction such that both end portions of the inner through hole portion are constructed by tapered wide-mouthed portions having preferably a tapered shape, and a conductive cylindrical member having an outer surface whose shape corresponds to an inner surface of the wide-mouthed portion is inserted into the inner through hole portion. Therefore, the space between the outer surface of the cylindrical member and the insulator and the space between the inner surface of the cylindrical member and the optical fiber can be easily sealed by the glass material by heating the inorganic glass arranged on the inner and outer portions of the conductive cylindrical member by means of a high-frequency induction heating. Thus, it is possible to easily produce the end sealed portions.

Moreover, since an inorganic adhesive agent consisting mainly of silica and alumina or a heat-resistive organic adhesive agent such as polyimide resin or fluoro-silicone resin is arranged between the insulation gas or the organic insulation material and the cylindrical member, it is possible to reduce a heat conduction to the insulation gas such as $SF_6$ etc. or the organic insulation material which suffers a damage easily when the insulator is heated for the sealing treatment of both end portions.

When the optical fiber-containing insulator has the construction mentioned above and the organic insulation material such as silicone rubber, urethane rubber etc. is filled in the inner through hole portion, it is preferred to use an optical fiber such that an outer surface of the glass fiber consisting mainly of quartz is covered with an organic material which is airtightly connected with the optical fiber so as to maintain a mechanical strength thereof. Also, with respect to an outer surface of the covered layer, a primer treatment is performed using a silane coupling agent, so as to maintain good connections between the rubber and the optical fiber.

Moreover, as to the rubber mentioned above, it is preferred to use a material having a predetermined tensile strength and an elongation at a break point since it is better for a shrinkage and an expansion generated by a variation of environmental temperatures.

Further, as to the glass for the sealing material, it is preferred to use the glass having a lower thermal expansion coefficient than that of the porcelain so as to reduce a residual stress on the sealing operation and to maintain the mechanical strength of the glass sealing portion with respect to a thermal stress generated due to a variation of the environmental temperatures, and to use the glass which can perform the sealing operation in a low temperature. Furthermore, since the glass is volume-shrunk on a melting state, it is preferred to use a glass formed body which is formed in the fitting shape into the conductive cylindrical member and has holes through which the optical fibers are passed and then is calcined, so as to seal the predetermined length between the inner surface of the conductive cylindrical member and the optical fibers effectively.

As to the sealing operation of the glass portion, it is necessary to use a high-frequency induction heating which can melt a glass by a partial heating, so as to make an end sealing construction by one heating operation. Moreover, as to a material for the conductive cylindrical member which is to be heated by the high-frequency induction heating mentioned above, it is preferred to use a material having a lower thermal expansion coefficient than that of the porcelain, as is the same as the glass material, such as conductive ceramics such as zirconium diboride and metal materials such as Kovar consisting mainly of iron and nickel-based alloys. As to the metal materials, it is preferred to use the metal materials on which surface treatments such as an oxidizing process have been previously performed, so as to improve a wettability with respect to the glass and to eliminate a deterioration of the glass on the heating for the sealing operation.

BRIEF DESCRIPTION OF THE DRAWINGS

FIGS. 2a to 2e are schematic views illustrating respective steps of a producing process of the optical fiber-containing insulator shown in FIG. 1.

DESCRIPTION OF THE PREFERRED EMBODIMENTS

Figure 1:
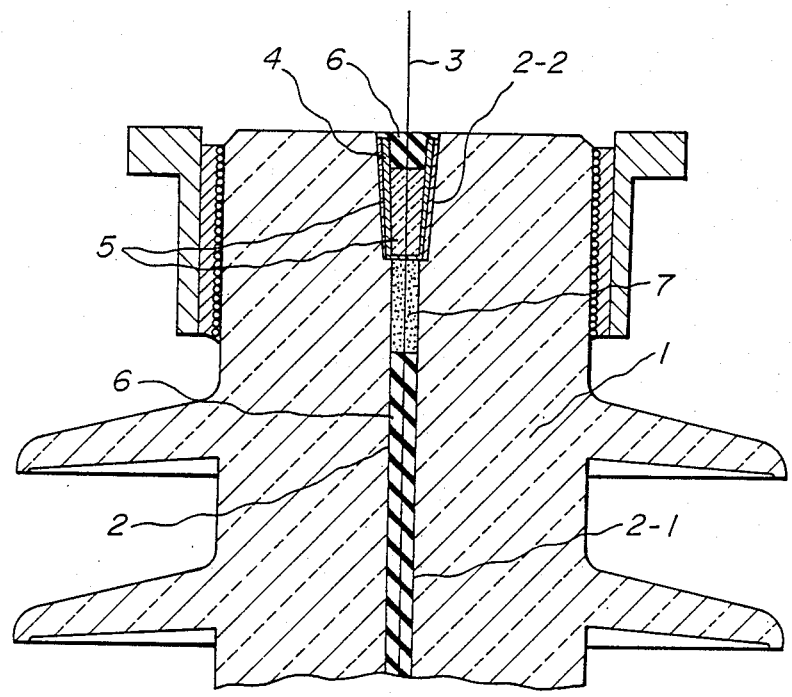
FIG. 1 is a schematic view showing one end structure of an optical fiber-containing insulator according to the invention.

FIG. 1 is a schematic view showing one end structure of an optical fiber-containing insulator according to the invention. In the embodiment shown in FIG. 1, at least one optical fiber 3 in which a part of a covering layer corresponding to a glass sealing portion is removed and a middle portion 2-1 of a through hole 2 arranged in a middle axis of an insulator 1 are sealed with each other by using a silicone rubber 6 which is one example of organic insulation materials. Moreover, the optical fiber 3 arranged between the middle portion 2-1 of the through hole 2 and a wide-mouthed portion 2-2, having preferably a tapered shape, of the through hole 2 is sealed by using inorganic or organic adhesive agents 7 having heat-resistive properties. Further, a space between the optical fiber 3 and a cylindrical member 4 having an optical fiber insertion hole at its bottom portion and made of conductive ceramics or metal materials etc. and a space between the cylindrical member 4 and the wide-mouthed portion 2-2 of the through hole 2 are airtightly sealed by a glass 5. Furthermore, a part of the optical fiber 3 projected outwardly from the wide-mouthed portion 2-2 is covered with a silicone rubber 6 so as to protect the projected part of the optical fiber 3.

Hereinafter, a producing process of the optical fiber-containing insulator mentioned above will be explained. FIGS. 2a to 2e are schematic views showing respective steps of the producing process of the optical fiber-containing insulator shown in FIG. 1, in which silicone rubber is especially used as a sealing material among an insulation gas and organic insulation materials.

FIG. 2a is a schematic view showing one embodiment of an optical fiber used for a sealing In FIG. 2a, as to the optical fiber 3, use is made of a fiber made of quartz glass having a core diameter of 80 μm and a clad diameter of 125 μm. In order to maintain airtight properties of the optical fiber 3 itself, a covering portion 3-2 made of UV cured polyurethane acrylate resin is adhered airtightly on an outer surface of a core portion 3-1 made of quartz glass. The reason for using acrylic resin of polyurethane system as the covering portion 3-2 of the optical fiber 3 is that it has good properties against a temperature variation after adhering with a silicone rubber filled in the middle portion of the through hole 2 of the insulator 1.

Moreover, a silane coupling agent 3-3 is applied on an outer surface of the covering portion 3-2 of the optical fiber 3 so as to improve airtight connection properties between the silicone rubber and the covering portion 3-2. Further, in order to perform a complete airtight sealing between a sealing glass and the optical fiber 3 and in order not to foam the sealing glass by firing the organic covering portion 3-2 of the optical fiber 3 due to a high temperature on a melting of the sealing glass, a 35 mm long part of the covering portion 3-2 corresponding to a sealing portion between the optical fiber 3 and the sealing glass is immersed in ethanol for 30 minutes, and then is removed mechanically by means of a jacket stripper so as to make a removed portion 3-4 of the covering portion 3-2.

FIG. 2b is a schematic view showing a step for sealing the optical fiber into the center axis portion of an inner hole portion by using a silicone rubber as an adhesive agent. The insulator 1 which is 826 mm long has a body portion having a diameter of 80 mm and the through hole 2 having a diameter of 10 mm at its center axis. Moreover, wide-mouthed portions 2-2, 2-3 which are 50 mm long in its center axis direction of the insulator 1 and having a taper angle of 5° are arranged in both end portions of the through hole 2.

One optical fiber 3, to which the above preprocess is performed, is set into the through hole 2 formed at its center axis of the insulator 1. After that, the silicone rubber 6 to which a vacuum defoaming treatment is performed for 30 minutes under a vacuum pressure beneath 1 Torr. is filled in the middle portion 2-1 of the through hole 2 along a 660 mm length. The filling operation is performed so as not to injure the optical fiber 3 by using a support member 8 having an insertion hole of the optical fiber 3 and a hole for filling the silicone rubber 6 and on an outer surface of which is applied a fluoroplastics layer so as not to adhere with the silicone rubber 6.

In this case, it is preferred to perform a vacuum aspiration from the wide-mouthed portion 2-3 opposed to the wide-mouthed portion 2-2 from which the silicone rubber 6 is pressure-inserted, since the silicone rubber 6 is not foamed on the filling operation. After the silicone rubber 6 is filled along 660 mm at its middle portion, the silicone rubber is cured at 80° C. for 4 hours. Moreover, as to the silicone rubber 6, it is preferred to use a silicone rubber of addition reaction type having a good curing property when it is filled into a long narrow inner through hole. Further, it is preferred to use a silicone rubber having a large tensile strength and a large elongation on the break-down point since it is good against deteriorations.

FIG. 2C is a schematic view showing a step for filling the heat-resistive adhesion agent proceeding to the silicone rubber filling step. After filling the silicone rubber 6, the heat-resistive adhesive agents 7 are filled from end portions 6-1 and 6-2 of the silicone rubber 6 to the end portions of the wide-mouthed portions 2-2 and 2-3 of the insulator 1. The filling operation of the heat-resistive adhesive agent 7 is performed by using the same support member as that of the filling operation of the silicone rubber 6. Moreover, use is made of the heat-resistive adhesive agent 7 having a paste state and to which the vacuum defoaming treatment is previously performed. As to the heat-resistive adhesive agent 7, use is made of an inorganic material consisting mainly of silica and alumina and having a heat proof temperature of 1600° C. or a heat-resistive organic material consisting mainly of polyimido resin and having a heat proof temperature of 500° C. The hardening operation of the adhesive agent 7 is performed by heating it for 2 hours at 100° C. after a pre-hardening operation for 12 hours at room temperature and then for 4 hours at 80° C. in case of the inorganic adhesive agent or by heating it for 2 hours at 180° C. after a pre curing operation for 30 minutes at 100° C. and then for 30 minutes at 120° C. in the case of the heat-resistive organic adhesive agent.

FIG. 2d is a schematic view showing a step for glass sealing the end portions proceeding to the heat-resistive adhesive agent filling step. At first, the cylindrical member 4 made of Kovar comprising an outer portion having the same taper angle of 5° as that of the inner portion of the wide-mouthed portions 2-2 and 2-3 of the insulator 1, a bottom portion having an insertion hole of the optical fiber 3 and to which the glass 5 is previously applied is formed. A washing for degreasing is performed and then a surface washing is performed by using an acid such as an FeCl$_3$ solvent with respect to the thus formed cylindrical member 4. Further, an oxidizing treatment is performed for improving the wettability with the glass 5 and for making the adhesion reaction on the glass melting complete. The oxidizing treatment is performed for 20 hours at 800° C. under the atmosphere. The glass 5 is sprayed to about 1 mm thickness on the outer portion of the cylindrical member 4 made of Kovar. After that, the thus sprayed cylindrical member 4 is dried for 30 minutes at 80° C. and is calcined for 1 hour at 320° C. by using an electric furnace. Then, the cylindrical member 4 on which the glass 5 is adhered by the calcining operation is set in the wide-mouthed portion 2-3 of the through hole 2 of the insulator. Moreover, as to the glass 5, use is made of lead borate glass having a low thermal expansion coefficient and a low melting point. Further, a glass calcined member 5-1 having a length of 35 mm, an outer diameter substantially equal to an inner diameter of the cylindrical member 4 and a through hole for the optical fiber 3 is set in the cylindrical member 4.

The glass calcined member 5-1 is formed by mixing a small amount of an organic binder such as methylcellulose and water with the lead borate glass, pressing the mixed glass, processing an outer surface of the pressed body and a through hole for the optical fiber, and heating the processed body for 1 hour at 320° C. after increasing a temperature by a heating rate of 50° C./hr. Then, a coil 10 having seven turns and made of copper is arranged around the outer surface of the insulator 1 and a high-frequency voltage is applied to the coil 10 from a generator of the high-frequency induction voltage. By applying the high-frequency voltage to the coil 10, a high-frequency induction current is generated in the Kovar cylindrical member 4 and thus, the cylindrical member 4 is self-heated. In this case, a condition of applied high-frequency voltage and current is set in the manner such that a temperature of the cylindrical member 4 becomes 500° C.

As a result, a temperature of the cylindrical member 4 becomes 500° C. for about 20 minutes after a start of the high-frequency voltage applying. Then, the cylindrical member 4 is maintained for about 10 minutes at 500° C. under the condition such that a load of 20 kg is applied on an upper surface of the cylindrical member 4 so as to seal airtightly a space between an outer surface of the cylindrical member 4 and the wide-mouthed portion 2-3 by a melted glass 5 and also to melt the glass calcined member 5-1 arranged in the cylindrical member 4. After that, an air cooling is performed.

FIG. 2e is a schematic view showing a step of protecting the optical fiber at the end portions of the insulator proceeding to the glass sealing step. In order to protect the covering portion 3-2 of the optical fiber 3 projected from the glass sealing portion in the wide-mouthed portion 2-3 of the insulator 1, a vacuum defoamed silicone rubber 6 is filled around the projected optical fiber 3 in the wide-mouthed portion 2-3 and is cured by heating it for 1 hour at 80° C.

In a series of processing steps mentioned above, at first the sealing step and the protecting step of the covering portion are effected with respect to one end portion of the insulator, and then after the insulator 1 is turned over the same steps are effected with respect to the other end portion of the insulator.

In this case, in the case that use is made of the insulation gas such as SF$_6$ or the insulation material such as the insulation grease or oil as the center filling member in the insulator, the sealing step of the end portion and the protecting step of the covering portion are performed in the same manner as those of the steps mentioned above. However, in this case, after the sealing step and the protecting step are performed with respect to one end portion of the insulator, the optical fiber-containing insulator is produced by turning over the insulator, filling the insulation gas or material and performing the sealing step and the protecting step with respect to the other end portion.

After that, a flange metal member is adhered to an outer end portion of the insulator by using a cement in the same manner as that of the known insulator, and finally the optical fiber-containing insulator is obtained.

Hereinafter, an actual embodiment in case that use is made of the silicone rubber as the filling material will be explained.

Embodiment

Optical fiber-containing insulators were produced in the producing steps shown in FIGS. 2a to 2e by using two kinds of the insulators 1 and two kinds of the sealing glasses 5 both having properties shown in Table 1, the optical fiber 3 made of the covering portion 3-2 and the silicone rubber 6 both having properties shown in Table 2, the cylindrical members 4 made of the materials shown in Table 3 and the heat-resistive adhesive agents having properties shown in FIG. 4.

With respect to the optical fiber-containing insulators mentioned above, a few of various test items shown in Table 5 were performed according to test conditions shown in Table 5. Moreover, as comparative examples, optical fiber-containing insulators having a conventional structure such that the silicone rubber 6 was filled in all the through hole 2 of the insulator 1 or having a conventional structure such that the sealing was performed only by the glass 5 in the wide-mouthed portions 2-2, 2-3 of the through hole 2. Material combinations to be tested are shown in Table 6.

TABLE 1

|  | Insulator A | Insulator B | Glass A | Glass B |
|---|---|---|---|---|
| Thermal expansion coefficient ($\times 10^{-7}$ °C.) | 74 | 56 | 42 | 58 |
| Melting temperature (°C.) | — | — | 420 | 450 |
| Main composi- | SiO$_2$, Al$_2$O$_3$ | SiO$_2$, Al$_2$O$_3$ | PbO, TiO$_2$ B$_2$O$_3$ | PbO, SiO$_2$ B$_2$O$_3$, Li$_2$O |

TABLE 1-continued

|  | Insulator A | Insulator B | Glass A | Glass B |
|---|---|---|---|---|
| tion |  |  |  |  |

TABLE 2

|  | Covering portion of the optical fiber | Silicone rubber |
|---|---|---|
| Tensile strength (kg/cm$^2$) | 400 | 50 |
| Elongation at breaking (%) | 45 | 500 |
| Hardness | (Shore D) 55 | (JIS) 30 |
| Material | UV cured polyurethane acrylate resin | Silicone rubber of addition reaction type |

TABLE 3

|  | Kovar | 42Ni Alloy | ZrB$_2$ (A) | ZrB$_2$ (B) |
|---|---|---|---|---|
| Thermal expansion coefficient ($\times 10^{-7}$/°C.) | 47 | 66 | 55 | 63 |
| Specific resistance at R.T. ($\mu\Omega \cdot$ cm) | 100 | 100 | 500 | 10 |
| Tensile breaking strength (kg/cm$^2$) | 5600 | 4000 | 8300 | 5500 |
| Material | 29% Ni, 17% Co, remainder Fe | 42% Ni remainder Fe | Zr, B | Zr, B |

TABLE 4

|  | Inorganic adhesion agent 1 | Inorganic adhesion agent 2 | Heat-resistive organic adhesive agent 3 |
|---|---|---|---|
| Heat-resistive temperature (°C.) | 1600 | 1200 | 500 |
| Adhesion strength (kg/cm$^2$) | 15 | 50 | 200 |
| Thermal expansion coefficient ($\times 10^{-7}$/°C.) | 60 | 40 | 770 |
| Main composition | SiO$_2$, Al$_2$O$_3$ | SiO$_2$, Al$_2$O$_3$ | Polyimide of addition reaction type |

TABLE 5

| Test items | Test conditions |  |
|---|---|---|
| Thermal shock test | Temperature difference: | 90° C. (warm water 90° C. cold water 0° C.) |
|  | Immersed time: | 30 minutes |
|  | Number of immersed time: | 5 cycles |
| Heat proof test | Heating temperature: | 60 ~ 160° C. (20° C. interval) |
|  | Constant temperature time: | 3 hrs. |
|  | Heating rate: | 100° C./Hr |
| Heat cycle test | Temperature difference: | 110° C. (warm 90° C., cold −20° C.) |
|  | Constant temperature time: | 3 hrs. |
|  | Number of cycle: | 3000 cycles |
| Long-term voltage applying test | Applied voltage: | 46.5 kV(AC) (voltage applied in open-air) |

TABLE 6

| Sample No. | Material |  |  |  | Heat-resistive inorganic adhesive agent | Remarks |
|---|---|---|---|---|---|---|
|  | Insulator | Cylindrical member | Glass | Silicone rubber |  |  |
| 1 | A | Kovar | A | filled | 1 | Present |
| 2 | A | ZrB$_2$(B) | A | filled | 2 | invention |
| 3 | B | 42Ni alloy | B | filled | 1 | tion |
| 4 | B | Kovar | A | filled | 1 |  |
| 5 | B | Kovar | A | filled | 3 |  |
| 6 | B | ZrB$_2$(A) | B | filled | 2 |  |
| 7 | A | 42Ni alloy | B | none | none | Comparison |
| 8 | B | Kovar | A | none | none | ison |
| 9 | A | none | none | filled | none |  |
| 10 | B | none | none | filled | none |  |

The various test items shown in Table 5 were performed for examining long-term properties of the sealing portion of the optical fiber-containing insulator. As to the thermal shock test, a fluorescent pentrant examination was performed with respect to the insulators of the sample Nos. 1 to 8 having the glass sealing construction so as to detect whether or not cracks were generated. Moreover, in the conventional insulators of the sample Nos. 9 and 10 having the silicon rubber sealing construction, whether or not the silicone rubber was projected from the seal end portion and whether or not cracks in the silicone rubber were generated were detected. In the heat proof test, whether or not a light transmission loss before and after the heat proof test existed, whether or not cracks in the sealing portion or in the insulator were generated and whether or not the silicone rubber was projected were detected.

Moreover, in the heat cycle test, a deterioration state of the sealing portion due to a long-term temperature stress was detected. In the insulators of the sample Nos. 1~8 having the glass sealing construction, whether or not cracks were generated was detected, and in the insulators of the sample Nos. 9 and 10 having the silicone rubber sealing construction, whether or not cracks were generated in the silicone rubber was detected. As to the long-term voltage applying test, whether or not a tracking was generated in the optical fiber-containing insulator after the long-term voltage applying operation was detected by cutting the insulator in pieces.

Test results are shown in Table 7.

Table 7

| | Sample No. | Thermal shock test | Resistance against crack formation after the heat proof test (°C) | | | | | | Resistance against crack formation after the heat cycle test (cycles) | | | | | | Resistance against crack formation after the voltage applying test (days) | | |
|---|---|---|---|---|---|---|---|---|---|---|---|---|---|---|---|---|---|
| | | | 60 | 80 | 100 | 120 | 140 | 160 | 500 | 1000 | 1500 | 2000 | 2500 | 3000 | 100 | 300 | 500 |
| Present Invention | 1 | ◎ | ◎ | ◎ | ◎ | ◎ | ◎ | ◎ | ◎ | ◎ | ◎ | ◎ | ◎ | ◎ | ◎ | ◎ | ◎ |
| | 2 | ◎ | ◎ | ◎ | ◎ | ◎ | ◎ | ◎ | ◎ | ◎ | ◎ | ◎ | ◎ | ◎ | ◎ | ◎ | ◎ |
| | 3 | ◎ | ◎ | ◎ | ◎ | ◎ | ◎ | ◎ | ◎ | ◎ | ◎ | ◎ | ◎ | ◎ | ◎ | ◎ | ◎ |
| | 4 | ◎ | ◎ | ◎ | ◎ | ◎ | ◎ | ◎ | ◎ | ◎ | ◎ | ◎ | ◎ | ◎ | ◎ | ◎ | ◎ |
| | 5 | ◎ | ◎ | ◎ | ◎ | ◎ | ◎ | ◎ | ◎ | ◎ | ◎ | ◎ | ◎ | ◎ | ◎ | ◎ | ◎ |
| | 6 | ◎ | ◎ | ◎ | ◎ | ◎ | ◎ | ◎ | ◎ | ◎ | ◎ | ◎ | ◎ | ◎ | ◎ | ◎ | ◎ |
| Comparison | 7 | ◎ | ◎ | ◎ | ◎ | ◎ | ◎ | ◎ | ◎ | ◎ | ◎ | ◎ | ◎ | ◎ | ◎ | ◎ | × |
| | 8 | ◎ | ◎ | ◎ | ◎ | ◎ | ◎ | ◎ | ◎ | ◎ | ◎ | ◎ | ◎ | ◎ | ◎ | △ | × |
| | 9 | ◎ | ◎ | ◎ | ◎ | △ | × | × | ◎ | ◎ | ◎ | △ | × | × | ◎ | ◎ | △ |
| | 10 | ◎ | ◎ | ◎ | ◎ | △ | × | × | ◎ | ◎ | ◎ | × | × | × | ◎ | ◎ | △ |

The definitions of marks shown in Table 7 are as follows. For the thermal shock test, the heat proof test and the heat cycle test, use was made of ten optical fiber-containing insulators for a respective one of the samples. Moreover, for the heat proof test and the heat cycle test, the same sample was used repeatedly at respective test levels.

In the test items mentioned above, a mark ◎ shows that all ten samples have no cracks, a mark △ shows that only one sample has cracks and the other nine samples have no cracks and a mark x shows that more than two samples have cracks and the other samples have no cracks.

Moreover, as to the long-term voltage applying test, use was made of five optical fiber-containing insulators at respective test levels in this case, a mark ◎ shows that all five samples have no trackings therein, a mark △ shows that one sample has trackings therein and the other four samples have no trackings therein and a mark x shows that more than two samples have trackings therein and the other samples have no trackings therein.

As a result, in the thermal shock test, it is confirmed that all the samples have no cracks. It is suggested that thermal expansion coefficients of the materials to be tested are suitably selected.

Moreover, in the heat proof test, it is confirmed that all the sample Nos. 1 to 8 having the glass sealing construction show no faults till a temperature of 160° C. and therefore have good properties. Contrary to this, it is confirmed that the sample Nos. 9 and 10 having the silicone rubber sealing constructions generate a projection of the silicone rubber at a temperature more than 120° C. It is suggested that, since the thermal expansion coefficient of the silicone rubber is about 30 times larger than that of the porcelain, the silicone rubber is expanded largely in a high temperature and thus the projection of the silicone rubber is generated due to a high stress concentration larger than a proper tensile strength of the silicone rubber. In the insulator used in substations etc. a temperature of the insulator becomes more than 80° C. due to a heat absorption in summer, and thus the optical fiber-containing insulator comprising the silicone rubber sealing construction having a low heat-resistive temperature is assumed to be wrong on the long-term properties.

In the heat cycle test, the sample Nos. 1 to 8 having the glass sealing construction show no faults up to 3000 cycles and thus have good properties. Contrary to this, the sample Nos. 9 and 10 having the silicone rubber sealing construction generate cracks in the silicone rubber over 2000 cycles.

Moreover, in a part of the samples, an exfoliation is detected between the silicone rubber and the covering portion of the optical fiber and between the silicone rubber and the inner through hole of the insulator boundary of the silicone rubber. From the result of a cutting examination after performing the heat cycle test of 3000 cycles with respect to the sample Nos. 1 to 6 having the glass sealing construction in which the silicone rubber is filled, the cracks in the silicone rubber or the exfoliation between the silicone rubber and the covering portion of the optical fiber are not detected at all, and thus it is assumed that deteriorations of the exfoliation are dependent upon a water component. That is to say, in the sample Nos. 9 and 10, since the heat cycle test is performed under a condition such that the insulator is exposed directly by the water component, it is assumed that the deteriorations proceed due to an existence of the water component.

As a result of the long-term voltage applying test, the sample Nos. 1 to 6 having the glass sealing construction in which the silicone rubber is filled show no trace of the trackings even after performing the long-term voltage applying test of 500 days. Contrary to this, the sample Nos. 7 and 8 having the glass sealing construction in which a vacant portion is arranged generate the partial trackings in the covering portion of the optical fiber even after performing the long-term voltage applying test of 300 days. Moreover, in the sample Nos. 9 and 10 having the silicone rubber sealing construction, it is confirmed that the trackings extend gradually from the sealing end portion to the inner portion. In the sample Nos. 7 and 8, it is assumed that the trackings generate gradually from near the end portion due to the water component and a stain etc. remained in the inner vacant portion on the sealing operation.

As can be seen from the test results mentioned above, the glass sealing construction is better than the silicone rubber sealing construction on the long-term properties, but, in case that the inner vacant portion remains, there is a fear of the tracking generation under the long-term voltage application. Therefore, the optical fiber-containing insulator according to the invention having the glass sealing construction at its both end portions of the through hole, in which the silicone rubber is filled in the middle portion of the through hole and the heat-resistive inorganic adhesive agent between the silicone rubber and the cylindrical member is filled in the through hole, is effective for improving a merit of the glass sealing construction.

It should be noted that the optical fiber-containing insulator in which urethane rubber, silicone oil, silicone grease or $SF_6$ gas is filled in the through hole in spite of the silicone rubber mentioned above can also obtain the substantially same properties.

As can be seen from the above, according to the optical fiber-containing insulator and the producing process thereof mentioned above, since the optical fiber-containing insulator has the merits of inorganic sealing construction and the organic sealing construction at its both end portions can be performed at one induction heating operating, it is possible to obtain a reliable optical fiber-containing insulator in an easy producing process.

What is claimed is:

1. An optical fiber-containing insulator, comprising:
    an insulator body having a through hole provided at a central axis portion thereof, said through hole having a wide mouthed portion arranged at each end portion of said insulator body;
    an optical fiber disposed in said through hole;
    an electrically conductive cylindrical member disposed within each said wide mouthed portion of said through hole;
    an inorganic glass disposed around said optical fiber in each said cylindrical member and between an inner surface of each said wide mouthed portion and an outer surface of each said cylindrical member;
    an insulation gas or an organic insulation material filled in said through hole in a middle portion of said insulator body; and
    a heat-resistive adhesive agent member disposed between said insulation gas or organic insulation material and each said cylindrical member.

2. A method of producing an optical fiber-containing insulator including an insulator body having a through hole provided in a central axis portion thereof and an optical fiber inserted into said through hole, an insulation gas or an organic insulation material being filled in said through hole in a central portion of said insulator body, comprising the steps of:
    (a) inserting the optical fiber into said through hole which has a wide-mouthed portion at each end portion of said insulator body;
    (b) filling said insulation gas or organic insulation material into said through hole in said central portion of said insulator body;
    (c) arranging a heat-resistive adhesive agent between a sealing portion consisting of said insulation gas or organic insulation material and each said wide-mouthed portion;
    (d) inserting a conductive cylindrical member having an outer surface corresponding to an inner surface of said wide-mouthed portion into each said wide-mouthed portion, said conductive cylindrical member having an inorganic glass formed thereon;
    (e) inserting an inorganic glass member into each said conductive cylindrical member around the optical fiber; and
    (f) melting said inorganic glass arranged between the inner surface of each said wide-mouthed portion and the outer surface of each said cylindrical member and said inorganic glass member arranged in each said cylindrical member, by heating each said conductive cylindrical member using a high-frequency induction heating method so as to form end sealing constructions.

* * * * *